US008639255B2

United States Patent
Inaba

(10) Patent No.: US 8,639,255 B2
(45) Date of Patent: Jan. 28, 2014

(54) SIMULATION SYSTEM, SIMULATION APPARATUS, AND SIMULATION METHOD

(75) Inventor: Takeshi Inaba, Tokyo (JP)

(73) Assignee: NEC Corporation, Tokyo (JP)

( * ) Notice: Subject to any disclaimer, the term of this patent is extended or adjusted under 35 U.S.C. 154(b) by 210 days.

(21) Appl. No.: 13/103,909

(22) Filed: May 9, 2011

(65) Prior Publication Data

US 2012/0028586 A1 Feb. 2, 2012

(30) Foreign Application Priority Data

Jul. 28, 2010 (JP) ................. 2010-169259

(51) Int. Cl.
*H04W 40/00* (2009.01)
*H04H 20/74* (2008.01)
*H04B 7/185* (2006.01)

(52) U.S. Cl.
USPC .......................... 455/446; 455/3.02; 455/12.1

(58) Field of Classification Search
USPC ............... 455/456.1, 456.5, 67.11, 446, 423, 455/412.2
See application file for complete search history.

(56) References Cited

U.S. PATENT DOCUMENTS

| 2003/0045302 A1* | 3/2003 | Oda et al. | 455/456 |
| 2004/0214577 A1* | 10/2004 | Borst et al. | 455/446 |
| 2004/0229616 A1* | 11/2004 | Dutta et al. | 455/436 |
| 2005/0208890 A1* | 9/2005 | Karabinis | 455/12.1 |
| 2008/0268816 A1* | 10/2008 | Wormald | 455/412.2 |

FOREIGN PATENT DOCUMENTS

JP 2003070050 A 3/2003

* cited by examiner

*Primary Examiner* — Andrew Wendell
*Assistant Examiner* — Cindy Trandai

(57) ABSTRACT

A simulation apparatus according to the present invention performs propagation simulation regarding the radio wave quality of a base station radio wave in a specific area. The apparatus includes: a receiving unit configured to receive, from a plurality of mobile terminals existing in the specific area, measured results of the radio wave quality of a base station radio wave from a base station around the mobile terminal, the field intensity of a GPS wave from a GPS satellite, and a position of the mobile terminal; and a simulating unit configured to identify a mobile terminal having the measured result of the field intensity at or above a predetermined value from the plurality of mobile terminals and correct a propagation equation used for the propagation simulation using the measured result of the radio wave quality at the position of the identified mobile terminal for performing the propagation simulation.

12 Claims, 3 Drawing Sheets

SIMULATION SYSTEM, SIMULATION APPARATUS, AND SIMULATION METHOD

This application is based upon and claims the benefit of priority from Japanese patent application No. 2010-169259, filed on Jul. 28, 2010, the disclosure of which is incorporated herein in its entirety by reference.

BACKGROUND OF THE INVENTION

1. Technical Field

The present invention relates to a simulation system, simulation apparatus, and simulation method that perform propagation simulation regarding the radio wave quality of base station radio waves.

2. Background Art

In mobile communications networks, in order to identify an area in which a mobile terminal can communicate, for example, propagation simulation regarding radio wave quality such as the field intensity of base station radio waves sent from a base station is performed by a simulation apparatus. For example, see, JP2003-070050A.

The simulation apparatus acquires measured results of the radio wave quality of the base station radio waves in a specific area, and corrects a propagation equation used for propagation simulation using the measured results for performing propagation simulation in the specific area. At this time, the propagation equation is corrected using the measured results of the radio wave quality at a plurality of positions, so that highly accurate propagation simulation can be performed in which the effect that is caused by the natural features of the landscape is reflected.

As a method of acquiring measured results of radio wave quality at a plurality of positions by the simulation apparatus, there is a method in which measured results are acquired from a vehicle used for acquiring measurements, in which the vehicle measures radio wave quality at a plurality of positions while running in fields. However, in this method, it is necessary that the vehicle used for acquiring measurements run in fields, causing a problem that takes time and effort.

As another method, there is a method of acquiring measured results from a plurality of individual mobile terminals, each of which measures its own radio wave quality at a position at which the terminal exists.

However, a problem arises in which the propagation equation, in which the effect that is caused by the natural features of the landscape is reflected, is not corrected and propagation simulation cannot be performed highly accurately unless radio wave quality is measured at a plurality of positions under the same conditions.

For example, in the case where radio wave quality is measured indoors, the measured result includes transmission loss caused by a building. In addition, transmission loss caused by a building varies depending on the structure of the building or a position inside the building. Because of this, in the case where radio wave quality is measured at a certain position in the inside of a building, measurements are performed under different conditions between that position and another position.

Thus, for correcting the propagation equation, it is necessary to use only the measured result of radio wave quality outdoors.

In the above-mentioned method of acquiring the measured results of radio wave quality from the mobile terminals, the measured results are acquired regardless of differentiation between mobile terminals located indoors or outdoors. For this reason, even though the propagation equation is corrected using the measured results as they are, highly accurate propagation simulation cannot be performed.

SUMMARY

An object of the present invention is to provide a simulation system, simulation apparatus, and simulation method that can solve the above-mentioned problems and improve the accuracy of propagation simulation.

In order to solve the foregoing object, a simulation system according to the present invention is a simulation system including: a simulation apparatus configured to perform propagation simulation regarding radio wave quality of a base station radio wave in a specific area; and a plurality of individual mobile terminals existing in the specific area, each of the plurality of individual mobile terminals including: a first measuring unit configured to receive the base station radio wave from a base station around the individual mobile terminal and measure the radio wave quality of the received base station radio wave; a second measuring unit configured to receive a GPS wave from a GPS satellite and measure field intensity of the received GPS wave; a third measuring unit configured to measure a position of the individual mobile terminal based on the GPS wave; and a transmitting unit configured to send measured results of the radio wave quality, the field intensity, and the position of the individual mobile terminal measured at the first to third measuring units to the simulation apparatus, the simulation apparatus including: a receiving unit configured to receive the measured results of the radio wave quality, the field intensity, and the position of the individual mobile terminal from each of the plurality of individual mobile terminals; and a simulating unit configured to identify an individual mobile terminal having the measured result of the field intensity at or above a predetermined value from the plurality of individual mobile terminals and correct a propagation equation used for the propagation simulation using the measured result of the radio wave quality at the position of the identified mobile terminal for performing the propagation simulation.

In order to solve the foregoing object, a simulation apparatus according to the present invention is a simulation apparatus configured to perform propagation simulation regarding radio wave quality of a base station radio wave in a specific area, the apparatus including: a receiving unit configured to receive, from a plurality of individual mobile terminals existing in the specific area, measured results of radio wave quality of a base station radio wave from a base station around the individual mobile terminal, field intensity of a GPS wave from a GPS satellite, and a position of the individual mobile terminal; and a simulating unit configured to identify an individual mobile terminal having the measured result of the field intensity at or above a predetermined value from the plurality of individual mobile terminals and correct a propagation equation used for the propagation simulation using the measured result of the radio wave quality at the position of the identified individual mobile terminal for performing the propagation simulation.

In order to solve the foregoing object, a simulation method according to the present invention is a simulation method adapted to a simulation apparatus configured to perform propagation simulation regarding radio wave quality of a base station radio wave in a specific area, the method including: receiving, from a plurality of individual mobile terminals existing in the specific area, measured results of radio wave quality of a base station radio wave from a base station around the individual mobile terminal, field intensity of a GPS wave from a GPS satellite, and a position of the individual mobile terminal; and identifying an individual mobile terminal having the measured result of the field intensity at or above a predetermined value from the plurality of individual mobile terminals and correcting a propagation equation used for the propagation simulation using the measured result of the radio wave quality at the position of the identified mobile terminal for performing the propagation simulation.

According to the present invention, in the simulation apparatus, the mobile terminal having the measured result of the field intensity of the GPS wave at or above a predetermined value is identified, the propagation equation used for propagation simulation is corrected using only the measured result of the radio wave quality at the position of the identified mobile terminal. It is highly likely that the identified mobile terminal exists outdoors, which has the measured result of the field intensity of the GPS wave at or above a predetermined value, and it is considered that the radio wave quality is measured under the same conditions. Accordingly, the propagation equation is corrected using only the measured result of the radio wave quality of the identified mobile terminal, so that it is possible to improve the accuracy of propagation simulation.

EXEMPLARY EMBODIMENT

In the following, an exemplary embodiment for carrying out the present invention will be described with reference to the drawings.

Figure 1:
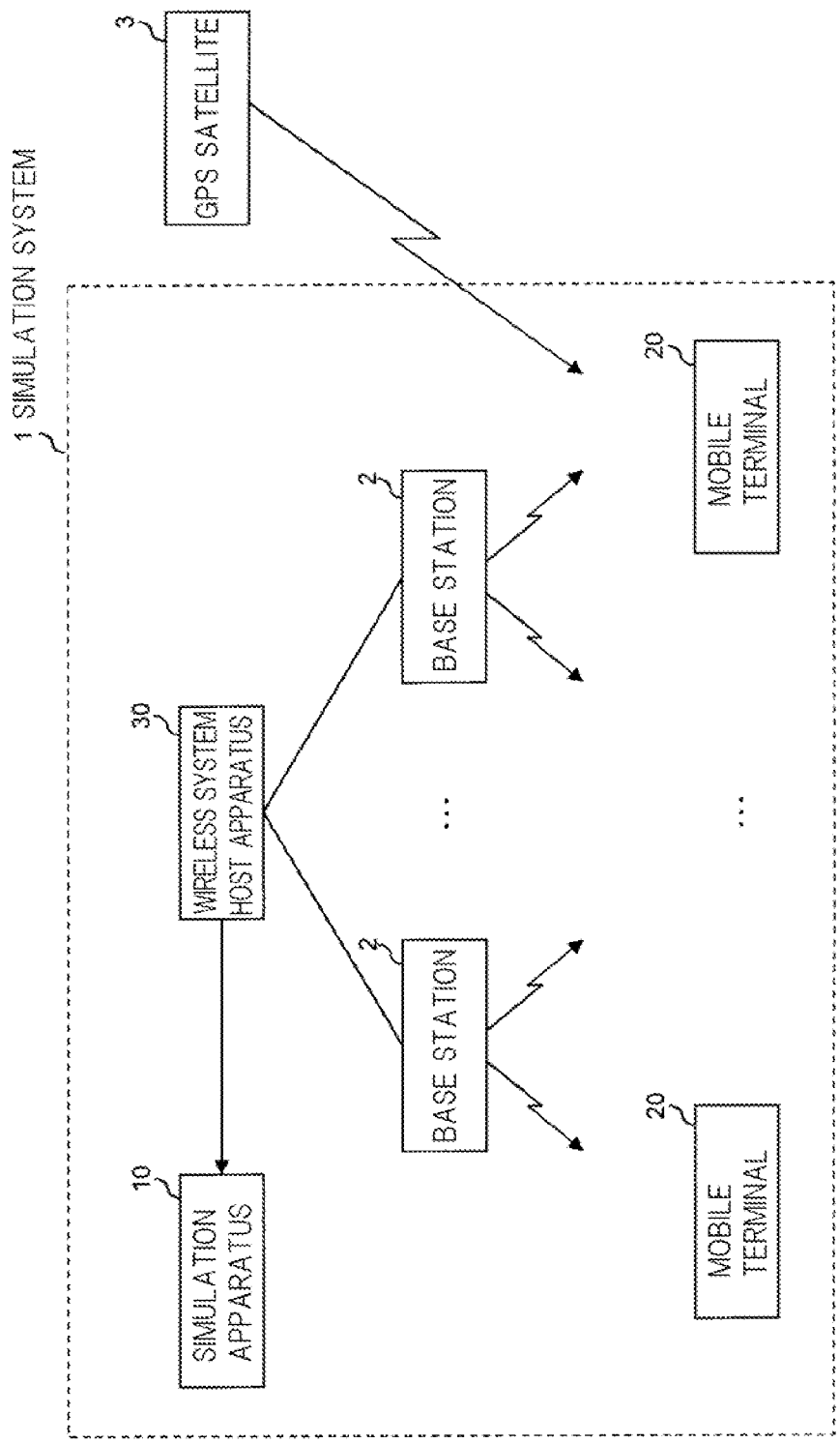
FIG. 1 is a diagram illustrating the configuration of a simulation system according to an embodiment of the present invention.

FIG. 1 is a diagram illustrating the configuration of simulation system 1 according to an embodiment of the present invention.

Simulation system 1 shown in FIG. 1 has a plurality of base stations 2, simulation apparatus 10, a plurality of mobile terminals 20, and wireless system host apparatus 30.

Simulation apparatus 10 corrects a propagation equation used for propagation simulation using the measured result of radio wave quality of base station radio waves sent from base station 2 at a plurality of positions in a specific area, and performs the propagation simulation in the specific area.

The plurality of mobile terminals 20 are mobile terminals in the specific area for which propagation simulation is performed. In addition, in the following, although the configuration and operation of one mobile terminal 20 will be described, the plurality of mobile terminals 20 have a similar configuration and perform similar operations.

Mobile terminal 20 receives base station radio waves from base station 2 therearound, and measures the radio wave quality of the received base station radio waves. In addition, for example, mobile terminal 20 measures, for radio wave quality, the field intensity, propagation loss, power density to noise power density ratio (Eb/No) per bit, and so on of base station radio waves. Moreover, mobile terminal 20 receives GPS waves from GPS (Global Positioning System) satellite 3, and measures the field intensity of the received GPS waves as well as measures its position based on the received GPS waves. Mobile terminal 20 then sends these measured results to base station 2 therearound.

Base station 2 transfers the measured results sent from mobile terminal 20 to wireless system host apparatus 30.

Wireless system host apparatus 30 transfers the measured results, which are measured by mobile terminal 20 and sent from base station 2, to simulation apparatus 10. In addition, for a specific example of wireless system host apparatus 30, a RNC (Radio network Controller) to control base station 2 or the like is possible.

The measured results, which are measured by mobile terminal 20 and transferred from wireless system host apparatus 30, are used for correcting the propagation equation.

Next, the internal configurations of simulation apparatus 10 and mobile terminal 20 will be described.

In addition, in this embodiment, it is possible that base station 2 is formed in any configuration as long as base station 2 has functions of sending the base station radio waves and transferring the measured results sent from mobile terminal 20 to wireless system host apparatus 30. Thus, explanation of the internal configuration is omitted. In addition, it is possible that wireless system host apparatus 30 is formed in any configuration as long as wireless system host apparatus 30 has a function of transferring the measured results, which are measured by mobile terminal 20 and sent from base station 2, to simulation apparatus 10. Thus, explanation of the internal configuration is omitted.

First, the internal configuration of simulation apparatus 10 will be described with reference to FIG. 2.

Figure 2:
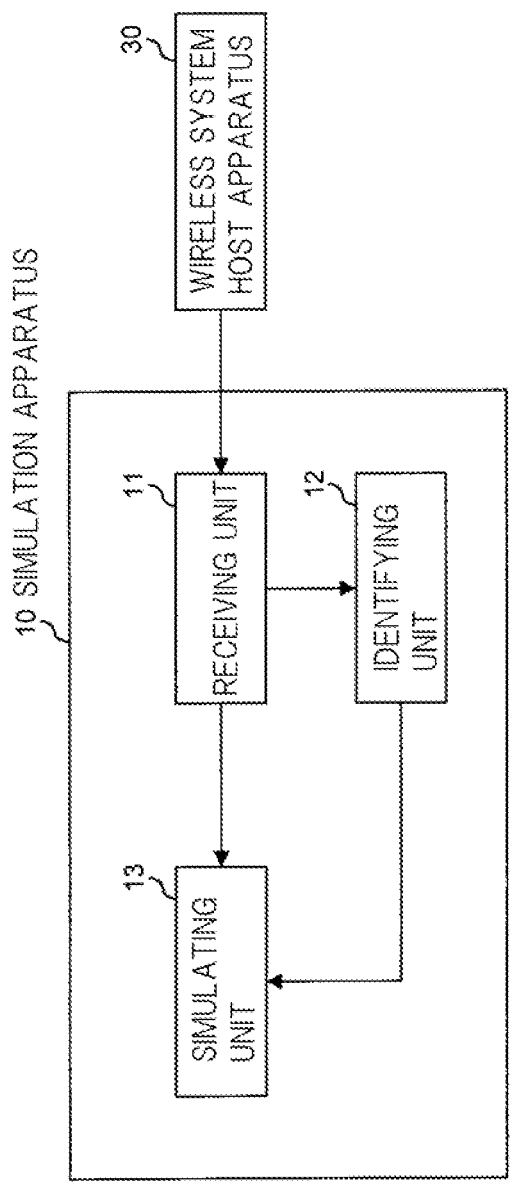
FIG. 2 is a block diagram illustrating the internal configuration of a simulation apparatus shown in FIG. 1.

Simulation apparatus 10 shown in FIG. 2 has receiving unit 11, identifying unit 12, and simulating unit 13.

Receiving unit 11 receives the measured results of the radio wave quality of the base station radio waves, the field intensity of the GPS waves, and the position of mobile terminal 20, which are measured by mobile terminal 20 and transferred from wireless system host apparatus 30, and outputs the measured result of the field intensity to identifying unit 12, and the measured results of the radio wave quality and the position to simulating unit 13.

Identifying unit 12 identifies mobile terminal 20 having the measured result of the field intensity of the GPS waves at or above a predetermined value from the plurality of mobile terminals 20.

Simulating unit 13 corrects the propagation equation using the measured results of the radio wave quality and position measured by mobile terminal 20, which is identified by identifying unit 12, for propagation simulation.

Next, the internal configuration of mobile terminal 20 will be described with reference to FIG. 3.

Figure 3:
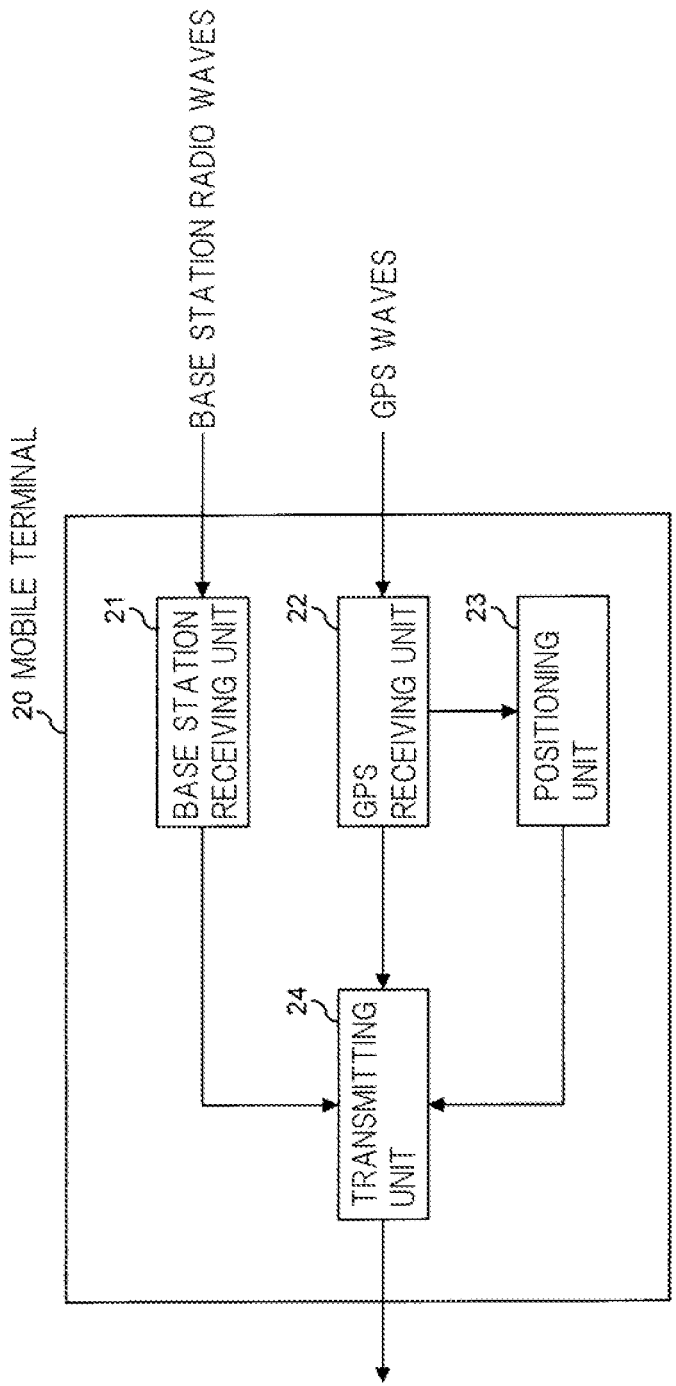
FIG. 3 is a block diagram illustrating the internal configuration of a mobile terminal shown in FIG. 1.

Mobile terminal 20 shown in FIG. 3 has base station receiving unit 21, GPS receiving unit 22, positioning unit 23, and transmitting unit 24.

In addition, base station receiving unit 21 is an example of a first measuring unit, GPS receiving unit 22 is an example of a second measuring unit, and positioning unit 23 is an example of a third measuring unit.

Base station receiving unit 21 receives base station radio waves from base station 2 therearound, measures the radio wave quality of the received base station radio waves, and outputs the measured results to transmitting unit 24.

GPS receiving unit 22 receives GPS waves from GPS satellite 3, measures the field intensity of the received GPS waves, and outputs the measured results to transmitting unit 24.

Positioning unit 23 measures the position of mobile terminal 20 to which positioning unit 23 belongs based on the GPS waves received by GPS receiving unit 22, and outputs the measured results to transmitting unit 24.

Transmitting unit 24 sends the measured results outputted from base station receiving unit 21, GPS receiving unit 22, and positioning unit 23 to base station 2 therearound.

Next, the operation of simulation system 1 will be described.

In each of the plurality of mobile terminals 20, base station receiving unit 21 receives base station radio waves from base station 2 therearound at regular time intervals or at timing at which measurement is externally instructed, and measures the radio wave quality of the received base station radio waves. In addition, in the following, base station receiving unit 21 is supposed to measure propagation loss for the radio wave quality of the base station radio waves.

GPS receiving unit 22 receives GPS waves from GPS satellite 3 at regular time intervals or at timing at which measurement is externally instructed, and measures the field intensity of the received GPS waves.

Positioning unit 23 measures the position of mobile terminal 20 to which positioning unit 23 belongs based on the GPS waves received by GPS receiving unit 22.

Transmitting unit 24 sends the measured results measured by base station receiving unit 21, GPS receiving unit 22, and positioning unit 23 to base station 2 therearound.

Base station 2 transfers the measured results sent from mobile terminal 20 to wireless system host apparatus 30, and wireless system host apparatus 30 transfers the measured results to simulation apparatus 10.

In simulation apparatus 10, receiving unit 11 receives the measured results, which are measured by each of the plurality of mobile terminals 20 and transferred from wireless system host apparatus 30.

Identifying unit 12 compares the measured results of the field intensity measured by each of the plurality of mobile terminals 20 with a predetermined value, Pgps, and identifies mobile terminal 20 having the measured result of the field intensity at or above value Pgps from the plurality of mobile terminals 20.

Here, when mobile terminal 20 receives GPS waves in the inside of a building, the measured result of the field intensity is decreased by an amount of transmission loss caused by this building that is greater than when mobile terminal 20 receives the GPS waves outdoors. For example, if value Pgps is set to a median value between the indoor and outdoor field intensity of the GPS waves measured in advance, it is highly likely that mobile terminal 20 having the measured result of the field intensity at or above value Pgps exists outdoors, whereas it is highly likely that mobile terminal 20 having the measured result below value Pgps exists indoors.

Thus, it is highly likely that mobile terminal 20 identified by identifying unit 12 exists outdoors. In addition, in the following, mobile terminal 20 identified by identifying unit 12 is referred to as identified mobile terminal 20.

Simulating unit 13 abandons the measured results measured by mobile terminals 20 other than identified mobile terminal 20, and corrects the propagation equation using the measured results of the propagation loss and position measured by identified mobile terminal 20.

Here, for examples of the propagation equation for calculating propagation loss, there are propagation equations such as the Okumura Hata method and the COST 231 HATA model.

In the following, an example is taken and explained in which simulating unit 13 corrects a propagation equation, which is the Okumura Hata method expressed in Equation (1).

$$L_p = 69.55 + 26.16 \log f - 13.82 \log h_b - a(h_m) + (44.9 - 6.55 \log h_b) \log d \quad \text{Equation (1)}$$

In Equation (1), $L_p$ is the propagation loss of the base station radio waves, f is the frequency of the base station radio waves sent from base station 2, $h_b$ is the antenna height of base station 2, $h_m$ is the antenna height of mobile terminal 20, and d is the distance from this base station 2.

In addition, in Equation (1), to $a(h_m)$, a different equation is applied depending on whether a specific area for which propagation simulation is performed is in a large city or in a medium-small city, as shown in Equation (2). Moreover, to $a(h_m)$, a different equation is applied depending on whether the frequency of the base station radio waves is 400 MHz or more if this specific area is in a large city.

a. Medium-small city $$a(h_m) = (1.1 \log f - 0.7) h_m - (1.56 \log f - 0.8)$$

b. Large city $$a(h_m) = 8.29 \{\log(1.54 h_m)\}^2 - 1.1 \, (f \leq 400 \text{ MHz})$$

$$a(h_m) = 3.2 \{\log(11.75 h_m)\}^2 - 4.97 \, (400 \text{ MHz} \leq f) \quad \text{Equation (2)}$$

Simulating unit 13 determines an equation to be applied to $a(h_m)$ in Equation (1) depending on whether a specific area for which propagation simulation of the base station radio waves is performed is in a large city or in a medium-small city, and whether the frequency of the base station radio waves is 400 MHz or more, or below 400 MHz if this specific area is in a large city.

In addition, simulating unit 13 determines whether the specific area is in a large city or in a medium-small city based on map data, for example.

Moreover, simulating unit 13 in advance acquires base station information such as the positions of the plurality of individual base stations 2, the frequency of the base station radio waves to send, antenna height, etc. Simulating unit 13 then determines whether the frequency of the base station radio waves is 400 MHz or more based on base station information on base station 2 that sends the base station radio waves for which propagation loss is calculated.

In addition, simulating unit 13 acquires base station information on the plurality of individual base stations 2 from wireless system host apparatus 30, for example. Because wireless system host apparatus 30 is a controller such as RNC that controls individual base stations 2, it has base station information on individual base stations 2.

Subsequently, simulating unit 13 considers one of the constants and factors on the right-hand side of Equation (1) to be a variable. In the following, as shown in Equation (3), an example is taken and explained in which constant (69.55) in Equation (1) is considered to be variable A. However, it is also possible to consider one of the other constants and factors to be a variable.

$$L_p = A + 26.16 \log f - 13.82 \log h_b - a(h_m) + (44.9 - 6.55 \log h_b) \log d \quad \text{Equation (3)}$$

Simulating unit 13 individually inputs a value to f, $h_b$, and $h_m$ in Equation (3).

More specifically, simulating unit 13 inputs a value corresponding to the height from the ground to the antenna height ($h_b$) of mobile station 20, in the state in which mobile station 20 is used by a user, for example. As the value, a predetermined value specified in advance is inputted.

In addition, simulating unit 13 inputs the value of the frequency of the base station radio waves to the frequency of the base station radio waves (f) for which propagation loss is calculated, and the value of the antenna height shown from base station information on base station 2 to the antenna height of base station 2 ($h_b$) that sends the base station radio waves.

Subsequently, simulating unit 13 inputs, to $L_p$ in Equation (3), the measured result of the propagation loss, inputs, to d, the distance between identified mobile terminal 20 and base station 2 that sends the base station radio waves, for each of the measured results of the propagation loss of the base station radio waves measured by identified mobile terminal 20, and then calculates the value of variable A on which Equation (3) is held. In addition, it is possible to calculate d from the position described in base station information on base station 2 and the measured result of the position of identified mobile terminal 20. In the following, suppose that simulating unit 13 calculates values A1, A2 to AN of variable A for each of the measured results of the propagation loss measured by N terminals of identified mobile terminals 20-1, 20-2 to 20-N.

For example, simulating unit 13 determines the mean value of calculated values A1, A2 to AN as the value of variable A, and replaces constant (69.55) in Equation (1) by the determined value of variable A for correcting the propagation equation.

Simulating unit 13 then uses the corrected propagation equation for propagation simulation in the specific area.

In addition, an example is taken and explained in which the propagation equation that calculates the propagation loss of the base station radio waves is corrected. However, it is possible to similarly correct the propagation equation that calculates radio wave quality other than propagation loss (field intensity, Eb/No, etc.).

More specifically, simulating unit 13 considers one of the constants and factors of the propagation equation that calculates radio wave quality to be a variable, and calculates the value of the variable for each of the measured results of the radio wave quality measured by a plurality of identified mobile terminals 20.

Simulating unit 13 then determines the value of the variable from the calculated result of each measured result, and replaces the constant or factor considered to be a variable by the determined value for correcting the propagation equation.

As discussed above, according to this embodiment, in simulation apparatus 10, mobile terminal 20 having the measured result of the field intensity of the GPS waves at or above a predetermined value is identified, and the propagation equation is corrected using only the measured result of the radio wave quality of the base station radio waves at the position of identified mobile terminal 20.

Here, it is highly likely that a mobile terminal having the measured result of the field intensity of the GPS waves at or above a predetermined value exists outdoors, and it is considered that the radio wave quality is measured under the same conditions. Thus, the propagation equation is corrected using only the measured result of the radio wave quality measured by the identified mobile terminal, so that it is possible to improve the accuracy of propagation simulation.

While the invention has been particularly shown and described with reference to exemplary embodiments thereof, the invention is not limited to these embodiments. It will be understood by those of ordinary skilled in the art that various changes in form and details may be made therein without departing form the spirit and scope of the present invention as defined by the claims.

What is claimed is:

1. A simulation system comprising:
   a simulation apparatus configured to perform propagation simulation regarding radio wave quality of a base station radio wave in a specific area; and
   a plurality of individual mobile terminals existing in the specific area, each of said plurality of individual mobile terminals including:
   a first measuring unit configured to receive the base station radio wave from a base station around said individual mobile terminal and measure the radio wave quality of the received base station radio wave;
   a second measuring unit configured to receive a GPS wave from a GPS satellite and measure field intensity of the received GPS wave;
   a third measuring unit configured to measure a position of said individual mobile terminal based on the GPS wave; and
   a transmitting unit configured to send measured results of the radio wave quality, the field intensity, and the position of said individual mobile terminal measured at said first to third measuring units to said simulation apparatus,
   said simulation apparatus including:
   a receiving unit configured to receive the measured results of the radio wave quality, the field intensity, and the position of said individual mobile terminal from each of said plurality of individual mobile terminals; and
   a simulating unit configured to identify an individual mobile terminal having the measured result of the field intensity at or above a predetermined value from said plurality of individual mobile terminals and correct a propagation equation used for the propagation simulation using the measured result of the radio wave quality at the position of said identified mobile terminal for performing the propagation simulation.

2. The simulation system according to claim 1, wherein said first measuring unit measures field intensity of the base station radio wave, propagation loss, or a power density to noise power density ratio per bit, for the radio wave quality of the base station radio wave.

3. The simulation system according to claim 1, wherein said simulating unit considers a constant or a factor of the propagation equation to be a variable, calculates a value of the variable for each measured result of the radio wave quality measured by each of said plurality of individual mobile terminals, determines the value of the variable from the calculated result of each measured result, replaces the constant or factor considered to be the variable by the determined value, and corrects the propagation equation.

4. The simulation system according to claim 2, wherein said simulating unit considers a constant or a factor of the propagation equation to be a variable, calculates a value of the variable for each measured result of the radio wave quality measured by each of said plurality of individual mobile terminals, determines the value of the variable from the calculated result of each measured result, replaces the constant or factor considered to be the variable by the determined value, and corrects the propagation equation.

5. A simulation apparatus configured to perform propagation simulation regarding radio wave quality of a base station radio wave in a specific area, the apparatus comprising:
   a receiving unit configured to receive, from a plurality of individual mobile terminals existing in the specific area, measured results of radio wave quality of a base station radio wave from a base station around said individual mobile terminal, field intensity of a GPS wave from a GPS satellite, and a position of said individual mobile terminal; and
   a simulating unit configured to identify an individual mobile terminal having the measured result of the field intensity at or above a predetermined value from said plurality of individual mobile terminals and correct a propagation equation used for the propagation simulation using the measured result of the radio wave quality at the position of said identified mobile terminal for performing the propagation simulation.

6. The simulation apparatus according to claim 5, wherein the radio wave quality of the base station radio wave refers to field intensity, propagation loss, or a power density to noise power density ratio per bit of the base station radio wave.

7. The simulation apparatus according to claim 6, wherein said simulating unit considers a constant or a factor of the propagation equation to be a variable, calculates a value of the variable for each measured result of the radio wave quality measured by each of said plurality of individual mobile terminals, determines the value of the variable from the calculated result of each measured result, replaces the constant or factor considered to be the variable by the determined value, and corrects the propagation equation.

8. The simulation apparatus according to claim 6, wherein said simulating unit considers a constant or a factor of the propagation equation to be a variable, calculates a value of the variable for each measured result of the radio wave quality measured by each of said plurality of individual mobile terminals, determines the value of the variable from the calculated result of each measured result, replaces the constant or factor considered to be the variable by the determined value, and corrects the propagation equation.

9. A simulation method adapted to a simulation apparatus configured to perform propagation simulation regarding radio wave quality of a base station radio wave in a specific area, the method comprising:
receiving, from a plurality of individual mobile terminals existing in the specific area, measured results of radio wave quality of a base station radio wave from a base station around said individual mobile terminal, field intensity of a GPS wave from a GPS satellite, and a position of said individual mobile terminal; and
identifying an individual mobile terminal having the measured result of the field intensity at or above a predetermined value from said plurality of individual mobile terminals and correcting a propagation equation used for the propagation simulation using the measured result of the radio wave quality at the position of said identified mobile terminal for performing the propagation simulation.

10. The simulation method according to claim 9, wherein the radio wave quality of the base station radio wave refers to field intensity, propagation loss, or a power density to noise power density ratio per bit of the base station radio wave.

11. The simulation method according to claim 9, wherein a constant or a factor of the propagation equation is considered to be a variable, a value of the variable for each measured result of the radio wave quality measured by each of said plurality of individual mobile terminals is calculated, the value of the variable from the calculated result of each measured result is determined, the constant or factor considered to be the variable by the determined value is replaced, and correcting the propagation equation.

12. The simulation method according to claim 10, wherein a constant or a factor of the propagation equation is considered to be a variable, a value of the variable for each measured result of the radio wave quality measured by each of said plurality of individual mobile terminals is calculated, the value of the variable from the calculated result of each measured result is determined, the constant or factor considered to be the variable by the determined value is replaced, and correcting the propagation equation.

* * * * *